Figure 3:
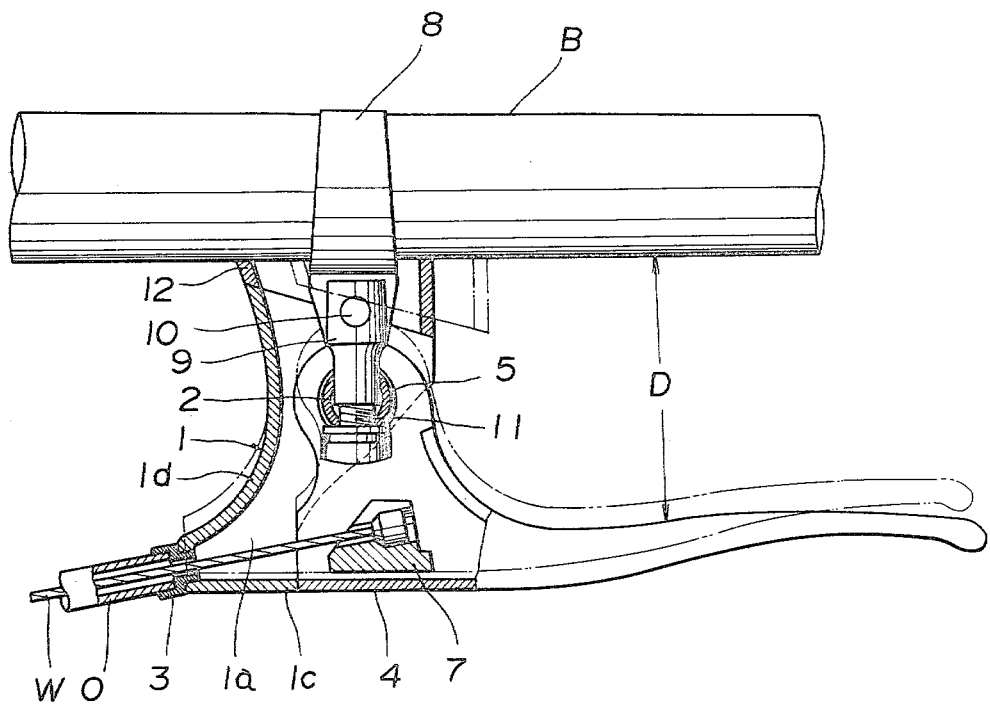

United States Patent [19]

Kine

[11] 4,318,307

[45] Mar. 9, 1982

[54] BRAKE OPERATING DEVICE FOR A BICYCLE

[75] Inventor: Masayoshi Kine, Osaka, Japan

[73] Assignee: Shimano Industrial Company Limited, Osaka, Japan

[21] Appl. No.: 26,696

[22] Filed: Apr. 3, 1979

[30] Foreign Application Priority Data

Apr. 14, 1978 [JP] Japan .......................... 53/49836[U]
May 16, 1978 [JP] Japan .......................... 53/66844[U]

[51] Int. Cl.³ .......................... G05G 1/00; G05G 1/04
[52] U.S. Cl. .......................................... 74/489; 74/491; 74/522; 74/523
[58] Field of Search ................ 74/489, 480 R, 480 B, 74/481, 482, 488, 522, 523, 524, 491

[56] References Cited

U.S. PATENT DOCUMENTS

| | | | |
|---|---|---|---|
| 3,776,061 | 12/1973 | Yoshigai | 74/480 R |
| 3,915,028 | 10/1975 | Kine | 74/480 R |
| 4,222,285 | 9/1980 | Kine | 74/480 R |

FOREIGN PATENT DOCUMENTS

| | | | |
|---|---|---|---|
| 272138 | 3/1951 | Fed. Rep. of Germany | 74/489 |
| 897660 | 11/1953 | Fed. Rep. of Germany | 74/489 |
| 1270433 | 6/1968 | Fed. Rep. of Germany | 74/489 |
| 2434300 | 1/1976 | Fed. Rep. of Germany | 74/489 |
| 557018 | 4/1926 | France | 74/489 |
| 924133 | 7/1947 | France | 74/489 |
| 1014731 | 6/1952 | France | 74/489 |
| 4323 | of 1913 | United Kingdom | 74/489 |
| 518932 | 3/1940 | United Kingdom | 74/489 |
| 1027240 | 4/1966 | United Kingdom | . |
| 1074953 | 7/1967 | United Kingdom | . |

*Primary Examiner*—C. J. Husar
*Assistant Examiner*—Mark A. Daugherty
*Attorney, Agent, or Firm*—Stevens, Davis, Miller & Mosher

[57] ABSTRACT

A brake operating device for a bicycle has a bracket which carries a control lever pivoted thereto and is adjustable mounted to a fixed member fixed to a handle bar of the bicycle. Structures are provided to enable the bracket position to be changed with respect to the fixed member to adjust the distance between the grip of the control lever and the handle bar without changing the relative position of an outer sheath of a control cable supported at the bracket with respect to a control wire of a control cable supported at the control lever.

3 Claims, 8 Drawing Figures

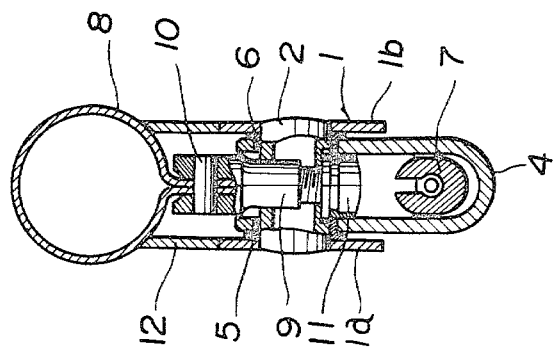
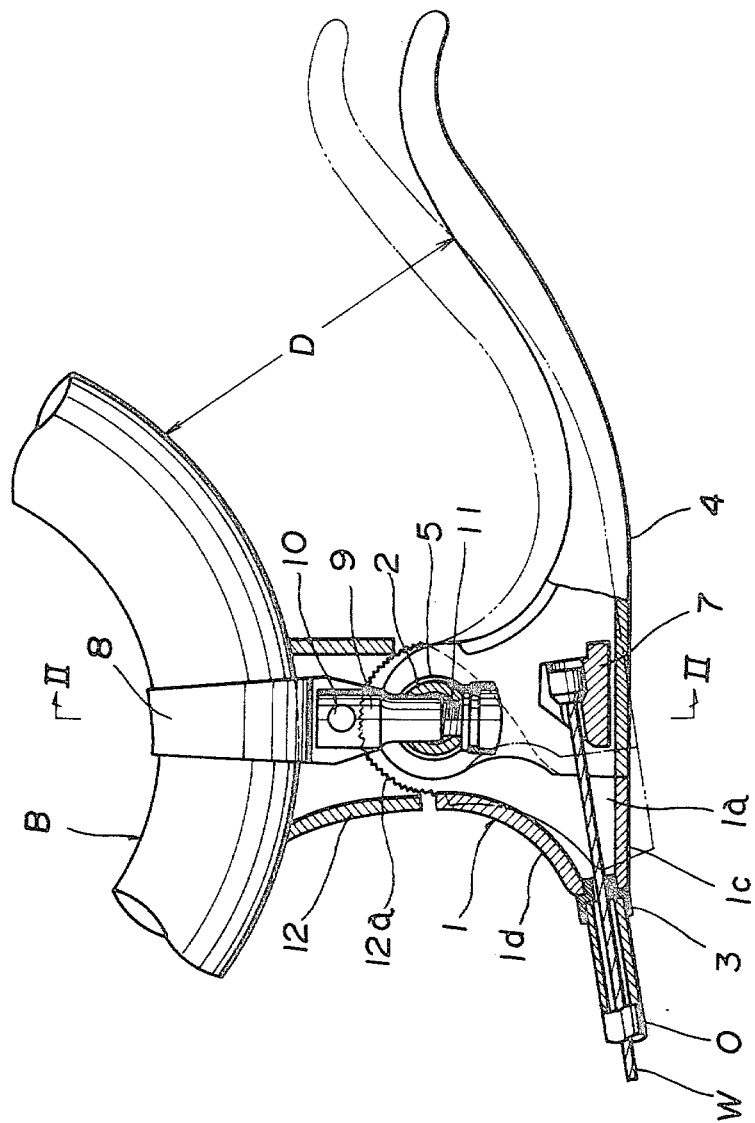

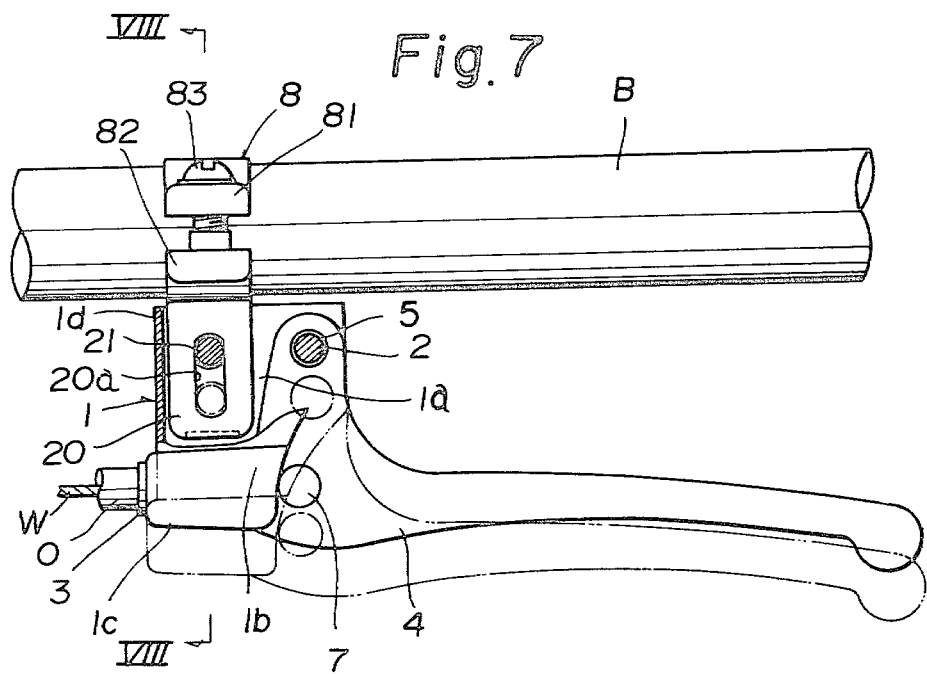
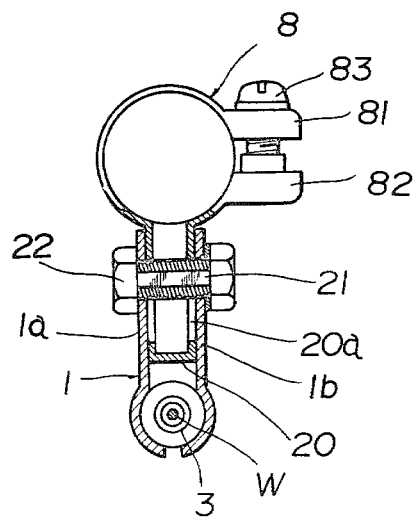

BRAKE OPERATING DEVICE FOR A BICYCLE

This invention relates to a brake operating device for a bicycle, and more particularly to a brake operating device comprising a fixed member fixed to a handle bar of the bicycle, a bracket mounted to the fixed member, and a control lever pivoted to the bracket.

Generally, this kind of brake operating device has the bracket fixed to the handle bar through a tightening band, or the fixed member directly mounted to the handle bar and carries a support for an outer sheath guiding a control wire. The control lever is pivoted to the bracket and carries a support for a control wire connected to the bicycle brakes to transmit thereto the lever control, whereby a rider grips the lever to pull the control wire for actuating the brakes.

When the bracket is fixed to the handle bar as described, the support for the control wire at the lever and that for the outer sheath at the bracket have respective definite positions, whereby when the bracket is mounted to the handle bar a distance between the lever body and the handle bar, that is, a grip dimension, is defined. The bracket, however, is variable in its mounting position to the handle bar. As a result, the grip dimension may become too large especially when the bracket is mounted to the bent section of a handle bar, or the grip dimension, even when the bracket is correctly mounted in position, occasionally does not fit the size of a riders hand.

The distance, i.e., grip dimension, has heretofore been adjusted in a manner which changes the outer sheath support position with respect to the bracket as well as changing the lever body position with respect to the bracket, or the support for the outer sheath has been formed of a threaded tube screwed with the bracket and projecting toward the lever, thereby being screwably adjusted by the extent of the projection.

However, in the former adjustment technique, the adjustment is complicated and the clearance between the brake shoes and the braked members, such as wheel rims, changes during adjustment leading to improper braking action. In the latter adjustment technique, the adjustment is subject to vibrations occurring during bicycle operation, causing misadjustments. Accordingly, the problems with adjusting the brake operating device remain.

This invention has been designed to overcome the problems. An object of the invention is to provide a brake operating device capable of simply and readily adjusting the grip dimension without changing the clearance between the brake shoes and the braked members, such as wheel rims, and of reliably maintaining the grip dimension in the adjusted position.

The brake operating device of the invention is constructed such that the bracket pivotally supporting the control lever is mounted movably with respect to the fixed member fixed to the handle bar, so that the bracket can be shifted with respect to the fixed member to adjust a distance between the grip of the lever and the handle bar without changing the relative position of the outer sheath supported at the bracket with respect to the control wire supported at the control lever.

The bracket moves with respect to the fixed member in the direction of changing the distance between the grip of the control lever and the handle bar, in other words, the bracket moves in two typical directions to change its angle with respect to the fixing member and to linearly move away from or toward the handle bar.

In the former case, a pivot is provided to pivotally support the bracket to the fixed member and the bracket turns around this point to thereby change its angle with respect to the fixed member. In the latter case, an elongated slot is provided at one of the bracket and fixed member to extend radially outwardly of the handle bar, while a stud fitted into the slot is provided at the other of the bracket and fixed member, so that the bracket is allowed to slide radially of the handle bar with respect to the fixed member to thereby adjust the bracket in position in the direction of moving the bracket away from or toward the fixed member.

Furthermore, fixing means is provided between the fixed member and the bracket for fixedly connecting the bracket with the fixed member, the fixing means also serving to fix the fixed member to the handle bar, thereby enabling the bracket to be fixed at its adjusted position to the fixed member.

As a result, the bracket, which is fixed to the fixed member through the fixing means, keeps the distance between the handle bar and the control lever in its adjusted position, thereby ensuring that the control lever is operated to obtain proper braking performance of the bicycle at a proper grip dimension between the lever and the handle bar.

Figure 4:
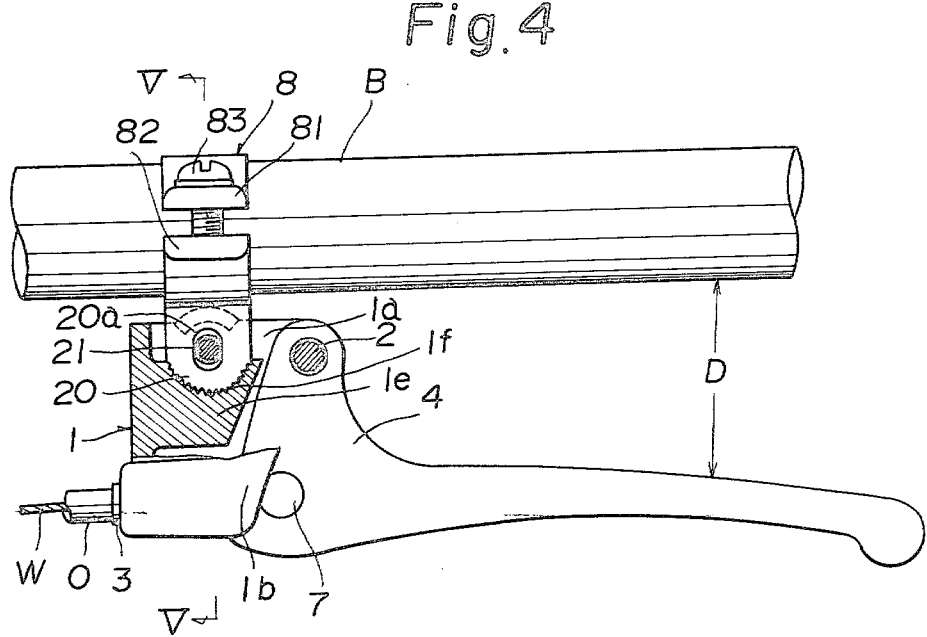
Figure 5:
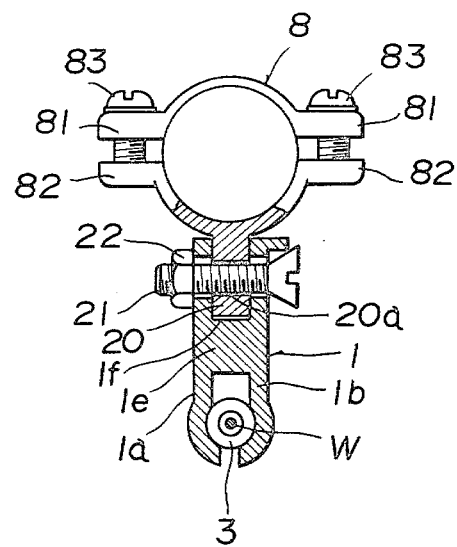
Figure 6:
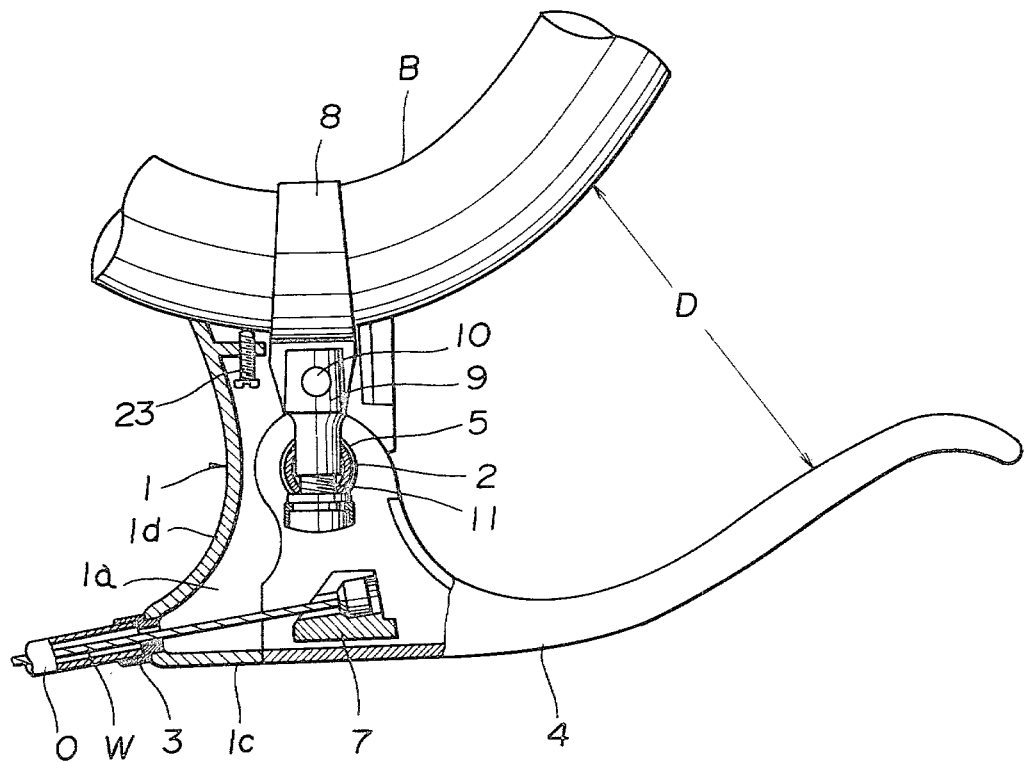

These and other object and novel features of the invention will be more apparent from the following description taken in conjunction with the accompanying drawings, in which FIG. 1 is a partially cutway front view of a typical embodiment of a brake operating device of the invention, FIG. 2 is a sectional view taken on Line II—II in FIG. 1, FIG. 3 is a partially cutaway front view of a modified embodiment of the invention shown in FIG. 1, FIG. 4 is a partially cutaway front view of another modified embodiment thereof, FIG. 5 is a sectional view taken on Line V—V in FIG. 4, FIGS. 6 and 7 are partially cutaway front views of still other modified embodiments of the invention, and FIG. 8 is a sectional view taken on Line VIII—VIII in FIG. 7.

Referring to the drawings, reference numeral 1 designates a bracket which comprises opposite side walls 1a and 1b, a top wall 1c connecting the side walls 1a and 1b, and a front wall 1d. A lever shaft 2 is supported between the side walls 1a and 1b and a support 3 for an outer sheath O guiding a control wire W is attached to the front wall 1d.

Reference numeral 4 designates a control lever which is rotatably supported to the lever shaft 2 through bushes 5 and 6. The control lever 4 is U-like shaped in section as shown in FIG. 2 and has within the U-like shaped portion a support 7 for holding one end of the control wire W.

Reference numeral 8 designates a tightening band fixed to a handle bar B. The tightening band 8 constitutes the fixed member used in the device of the invention. The fixed member, other than being formed as a tightening band, may be formed of a plate or block-like member which is directly fixed to the handle bar through attaching means, such as welding, but use of the tightening band is preferable.

There are two kinds of tightening bands 8. One of the bands 8 is, as shown in FIGS. 4, 5, 7 and 8, provided with at least a pair of tongues 81 and 82 one of which is provided with a threaded hole and the other with a through hole, and a headed screw bolt 83 which is inserted into the through hole and screwed with the threaded hole to thereby contract the band 8 in diameter to tighten about the handle bar B.

The other of the bands 8 is, as shown in FIGS. 1 through 3 and 6, fixed at tongues thereof to a first screw member 9 through a pin 10, the first screw member 9 being formed of a tubular member having a threaded bore. With this arrangement the band 8 is fixed to the handle bar B by use of the lever shaft 2 which is provided with a through hole radially extending thereof. The through hole is penetrated with a second screw member 11 of a screw bolt having the head larger in diameter than the through hole and the second screw member 11 is screwed at the tip of a threaded stem thereof with the first screw member 9. The second screw member 11 is screwed forward to draw the band 8 toward the bracket 1. As a result, the side walls 1a and 1b of bracket 1 are pressed at the end faces thereof onto the handle bar B, thereby fixing the bracket 1 thereto. In this instance, the bracket 1 is fixed to the handle bar B at the same time as the band 8 is tightened thereto.

The brake operating devices having the above described construction are shown in FIGS. 1 through 6, in which the bracket 1 is pivotally supported to the fixed member 8 by use of the lever shaft 2, whereby the bracket 1 is shifted at an angle with respect to the fixed member 8 and held in position with respect to the handle bar B by a fixing means.

Next, typical embodiments having this construction will be described.

Referring to FIGS. 1 and 2, the brake operating device is provided with an adapter 12 which is seated onto the handle bar B. The adapter 12 is inserted between the bracket 1 and the handle bar B and serves as a means for changing the position of bracket 1. The adapter 12 has an end face opposite to the bracket 1 and a concave element 12a formed as a substantially circular arc in longitudinal section. The side walls 1a and 1b at the bracket 1 have ends each of which is convex in a substantially circular arc in longitudinal section so that the concave end face 12a of the adapter may respectively mate with the convex ends of the bracket. Accordingly, the bracket 1 is turned at an angle around the lever shaft 2, and the second screw member 11 is screwed with the first screw member 9 to press the bracket 1 onto the adapter 12, so that the bracket 1 may be fixed to the handle bar B by way of the adapter 12 simultaneously with the fixing of the tightening band 8 to the handle bar B.

In the construction shown in FIGS. 1 and 2, the fixing means for fixing the bracket 1 at the adjusted position thereof comprises the first and second screw members 9 and 11 which are also used for drawing the tightening band 8 toward the bracket 1 so as to fix both the band 8 and bracket 1 to the handle bar B. Hence, the screw members 9 and 11 at the fixing means are unscrewed to loosen the tightening band 8 and simultaneously release the bracket 1 therefrom, thereby permitting a position adjustment of the bracket with respect to the tightening band 8. Thereafter the screw members 9 and 11 are again screwed tight to fix both the tightening band 8 and bracket 1 simultaneously to the handle bar B.

In the embodiments so far described, the adapter 12 may be entirely hollow to permit insertion therein of the tongues of tightening band 8 and first screw member 9, but is preferable to form adapter 12 of a tubular metallic plate as shown in FIG. 1 so that the adapter 12 may be movable free from the tightening band 8 and first screw member 9. Also, it is preferred that the concave end face 12a of the adapter 12 and the convex ends of the side walls 1a and 1b of the bracket 1 be provided with serrations so that bracket 1 and adapter 12 may mesh with each other.

The bracket 1 is fit at its convex ends into the concave end face of adapter 12 and is adjusted to a predetermined angle with respect to the adapter 12. Then the second screw member 11 is screwed forward and the bracket 1 is fixed to the handle bar B at the adjusted angle. The angular adjustment determines the distance or grip dimension between the lever body 4 and the handle bar B, the grip dimension, if necessary, being readily adjustable by unscrewing the second screw member 11 to change the angle of bracket 1 relative to the adapter 12.

It is to be noted that the adjustment, which changes the angle of bracket 1 relative to adapter 12, affects no relative position change between the control wire W held by the support 7 at the lever 4 and the outer sheath O held by the support 3 at the bracket 1. Hence, the clearance between the brake shoes and the braked members, such as wheel rims, is kept constant to always obtain a proper braking performance regardless of the grip dimension adjustment; that is there is no fear of causing two small a clearance between the brake shoes and rims which might cause the brake shoes to wear one-sidedly and hinder the braking performance.

The adapter 12, may also be formed differently than shown in the above embodiment. It may be skewed at the end face opposite to the bracket 1 and slide along the handle bar B as shown in FIG. 3, thereby enabling the bracket 1 to change its angle with respect to the adapter 12.

Besides this, in place of the adapter 12, the tightening band 8 may have a swollen portion 20 as shown in FIGS. 4 and 5 so that the bracket 1 may be mounted to the swollen portion 20 in relation of being angularly changeable.

In this instance, the swollen portion 20, as shown in FIGS. 4 and 5, has at its intermediate portion a through hole 20a, and is formed at the utmost end in a circular arc in longitudinal section around the through hole 20a. The bracket 1 is provided between the side walls 1a and 1b thereof with an interposed member 1e. The interposed member 1e has a concaved portion 1f as shown which mates with the utmost end of swollen portion 20. A pivot or screw bolt 21 separate from the lever shaft 2 is provided to pivotally support the bracket 1 to the swollen portion 20 and is screwed with fixing means formed as a nut 22, thereby fixing the bracket 1 at its adjusted position to the swollen portion 20.

In addition, it is preferable, in the arrangement shown in FIGS. 4 and 5, that the pivot 21 be headed and that serrations be provided at the convex utmost end of swollen portion 20 and the concave surface of interposed member 1e as shown in FIG. 1.

Also, in the arrangement shown in FIGS. 4 and 5, the grip dimension between the grip at control lever 4 and the handle bar B is desirably adjustable by unscrewing the nut 22 to move the bracket 1 angularly around the pivot 21.

Furthermore, in the brake operating device of the type shown in FIGS. 1 and 2, the adapter 12 may be replaced by a front wall 1d at the bracket 1 which is provided in the vicinity of the end mounted to the handle bar B with an adjust screw 23 directed toward the handle bar B as shown in FIG. 6. The adjust screw 23 may contact at its tip with the handle bar B to thereby change an angle of the bracket 1 with respect to the tightening band 8, thus adjusting the grip dimension. In addition, the adjust screw 23 may be replaced by a cam body or wedge.

Furthermore, in the brake operating device of the invention, the movement of bracket 1 with respect to the fixed member is not limited to the angular movement, but it may move linearly as shown in FIGS. 7 and 8.

The embodiment shown in FIGS. 7 and 8 is has a through hole 20a at the swollen portion 20 of the tightening band 8 formed as an elongate slot extending radially outwardly of the handle bar B. The pivot 21 insertable into the hole 20a is made not-circular in section so as to be movable within the through hole 20a lengthwise thereof, thereby allowing the bracket 1 to slide with respect to the tightening band 8. Hence, the bracket 1, which slides along the through hole 20a by way of the pivot 21 inserted therein, has its position adjusted by movement of the bracket away from or toward the handle bar B. Consequently, the distance between the lever 4 and the handle bar B is adjustable. In addition, there is no need for the swollen portion 20 in FIGS. 7 and 8 to be formed in a circular arc in longitudinal section at the utmost end thereof. A threaded nut 22 cooperates with threaded pivot 21 to retain bracket 1 in an adjusted position.

As clearly understood from the above description, the brake control of the invention is constructed such that the bracket pivotally supporting the control lever is made positionally adjustable with respect to a fixed member fixed to the handle bar and is fixable in an adjusted position, whereby the distance (grip dimension) between the grip of a control lever and the handle bar is adjusted. Hence, the grip dimension is adjustable simply and readily, while, the adjusted position is reliably maintained. Since the adjustment is carried out by moving the bracket with respect to the fixed member, the relative position of the control wire with respect to the outer sheath is not affected by grip dimension adjustments. Consequently, the proper clearance between the brake shoes and the braked members, such as wheel rims, is maintained without variations caused by grip dimension adjustments to thereby always obtain proper braking performance.

As many apparently widely different embodiments of this invention may be made without departing from the spirit and scope thereof, it is to be understood that the invention is not limited to the specific embodiments described but rather by the appended claims.

What is claimed is:

1. A brake operating device for a bicycle comprising: a fixing member fixed to a bicycle handle bar; a bracket having a brake control lever pivoted thereto about a pivot shaft, said control lever having a grip portion and a support portion supporting a control wire which transmits movement of said lever to bicycle brakes, said bracket having a support portion supporting an outer sheath guiding said control wire, said bracket being pivotally supported relative to said fixing member about said pivot shaft through a position changing means comprising a recess shaped as a circular arc concentric with said pivot shaft provided at one of the opposing surfaces consisting of a surface associated with said fixing member and a surface associated with said bracket and a swollen portion shaped in a circular arc to fit said recess provided at the other of said opposing surfaces, said bracket being adjustable around said pivot shaft to change an angle of said bracket with respect to said fixing member, such that the distance between said grip at said control lever and said handle bar is adjusted by changing the angle of said bracket, and means provided at said pivot shaft for fixing said pivot shaft to said fixing member and said bracket relative to said fixing member in an adjusted position.

2. A brake operating device for a bicycle according to claim 1, wherein said fixing means comprises a first screw member connected with said fixing member and projecting from said fixing member toward said bracket and a second screw member connected with said bracket and screwable with said first screw member, and said pivot shaft has a hole through which at least one of said first and second screw members is inserted, said screw members being screwed with each other to press said fixing member onto said handle bar and simultaneously fix said bracket relative to said fixing member.

3. A brake operating device for a bicycle according to claim 1, wherein said position changing means includes an adapter having said surface associated with said fixing member abutting against said surface associated with said bracket which is provided on said bracket at its mounting side to said handle bar, said adapter having a portion seated onto said handle bar, said bracket being movable relative to said adapter, the relative movement of said bracket with respect to said adapter causing a change in the angle of said bracket with respect to said fixing member, said fixing means urging said bracket toward said adapter, thereby fixing said bracket to said handle bar through said adapter.

* * * * *